United States Patent [19]

Nicholas

[11] Patent Number: 5,354,119

[45] Date of Patent: Oct. 11, 1994

[54] STORAGE CONTAINER MOUNTED TO A BACK OF A SEAT OR CHAIR

[76] Inventor: Mary J. Nicholas, 1209 Oldwanus Dr., Mt. Pleasant, S.C. 29464

[21] Appl. No.: 79,405

[22] Filed: Jun. 21, 1993

[51] Int. Cl.⁵ ............................................. A47C 7/62
[52] U.S. Cl. ................................ 297/191; 297/224; 297/485; 224/275
[58] Field of Search ............ 297/191, 188, 219, 224, 297/229, 464, 485; 206/293; 224/275

[56] References Cited

U.S. PATENT DOCUMENTS

| 94,448 | 8/1869 | Simonson | 297/191 |
| 574,731 | 1/1897 | Hatch | 297/485 |
| 2,707,988 | 5/1955 | Shaub et al. | 297/485 X |
| 4,131,313 | 12/1978 | Jacobs | 224/275 X |
| 4,232,898 | 11/1980 | Bodrero | 297/224 X |
| 4,946,221 | 8/1990 | Livingston | 297/224 X |

FOREIGN PATENT DOCUMENTS

| 7311872 | 3/1975 | Netherlands | 224/275 |
| 9114598 | 10/1991 | World Int. Prop. O. | 224/275 |

Primary Examiner—Laurie K. Cranmer
Attorney, Agent, or Firm—B. Craig Killough

[57] ABSTRACT

A container which is placed over a back of a seat or chair and holds articles within the container against the back of the seat or chair. The device has a sleeve which is placed over and surrounds a back of a seat or chair, with the sleeve held in place by elastic bands present at the top and bottom of the sleeve.

6 Claims, 2 Drawing Sheets

STORAGE CONTAINER MOUNTED TO A BACK OF A SEAT OR CHAIR

FIELD OF THE INVENTION

This invention relates generally to a container which may be used with seats or chairs, and is more particularly directed to a container which may be placed over a back of a seat or chair and which is held in place by elastic bands, and into which articles may be placed for organization, storage or transportation.

BACKGROUND OF THE INVENTION

Articles are frequently transported within the interiors of automobiles. Articles which are carried within automobiles are numerous, but include purses, shopping bags, cassette tapes, cellular phones, maps, books, travel guides, umbrellas, cosmetics, toys, portable flashlights, mail, baby bottles, snacks, groceries, including bottles and glasses which are subject to breaking and leaking and food items which may be crushed or mashed, facial tissues, pillows, sports equipment, including balls that tend to roll around, and the like.

Many of the items listed are placed on or around the front passenger seat area of the automobile, or on the dashboard. As the driver enters the car, it is convenient to place articles on the seat next to the driver. Likewise, articles are frequently and commonly placed on the floor of the vehicle.

Glove boxes or compartments and other storage compartments provided in automobiles by the manufacturer are not large enough for many of the items which people routinely carry in their cars. Further, such storage compartments are not convenient for all uses. For example, if a driver of an automobile purchases a gallon of milk at a convenience store, he or she is most likely to place the gallon of milk on the seat beside him or her, or on the floor of the automobile. A glove box is not large enough to contain such an article, and even if the article were of smaller size, many drivers will not take the time to open the glove box to place an article within it only to drive a short distance and remove the article from the car.

The presence of loose articles within a car presents a safety hazard. A loose article will fly about the interior during a sudden stop, start or turn, or during an impact. Loose articles will slide or shift beneath the operator's feet or the automobile's brake, accelerator or clutch pedals. Such occurrences increase the risk of injury to the driver or other passengers. Sudden stops of a more routine nature may cause an article to be thrown from a seat onto the floor of the vehicle, or about the floor, causing frustration for the driver or damage to the article. For example, a purse displaced from the seat may cause the purse to spill its contents, or a gallon of milk thrown about the car during a routine, but sudden, stop may cause the container to rupture. In most vehicles, there is no convenient storage container provided which will contain any article except the smallest of articles within the interior of the vehicle.

Similarly, a need exists for storage within the home, office or yard where suitable host objects such as chairs, loungers or dirty clothes hampers are present. For example, children's toys may be dispersed about a yard, the beach, or within a room.

SUMMARY OF THE PRESENT INVENTION

The present invention provides a storage container which may be used in conjunction with the back of a seat or chair. A tubular sleeve has an elastic band attached to the sleeve about a perimeter of a top opening of the sleeve, and about the perimeter of a bottom opening of the sleeve. The sleeve is placed over the back of the seat or chair, so as to surround the back of the seat or chair, and is held in place by the top and bottom elastic bands.

Articles may be placed within the container by stretching the top elastic band, and placing the article within the container, either in front of or behind the back of the seat or chair. When the top elastic band is released, the elastic band again contacts the seat about the perimeter or the band, and the container and the articles held therein are secured.

The girth of the tubular sleeve is larger than the length of the elastic bands when the elastic bands are in their contracted or constricted positions. In this way, space is provided within the sleeve to contain articles. The sleeve may be constructed of a mesh or stretch material to further expand as additional articles are placed within the container. Particularly with a mesh material, the device forms an expanding pocket as articles are placed within the sleeve, as the sleeve is held in place by the elastic bands. The mesh material also allows the articles within the container to be seen without "opening" the container.

The device may be used to contain articles within an automobile, or elsewhere. The articles are contained as desired on the front of the seat back or the rear of the seat back. When articles are removed from the front of the seat back, such as by placing them in the container and behind the seat, the passenger may sit in the seat without the necessity of removing the container from the seat back.

DESCRIPTION OF THE PREFERRED EMBODIMENT

A sleeve 2 is formed from a sheet of material. This material may be fabric. It is preferred that the sheet of material, such as fabric, have an elastic or stretch quality. In the preferred embodiment, the sleeve is formed from a knit mesh material. This netting or mesh material gives a desirable stretch quality as the material and the voids within the material stretch and adapt to articles contained within the sleeve.

A sheet of material is connected at one edge to an opposite edge to form sleeve 2. The resulting void which is surrounded by material yields a sleeve which may be thought of as a tubular sleeve, although the sleeve does not necessarily possess a round cross section.

The edges of the material may be joined to form a sleeve by any known means. The edges could be surged or sewn.

A piece of elastic, when not stretched, is sewn about the upper and lower edge, or perimeter of the sleeve. The elastic may be braided elastic or knit elastic, or other similar elastic material. When the elastic is unstretched, it will have a length which is substantially shorter than the girth of the sleeve. The top edge and bottom edge of the sleeve are gathered to allow the elastic to be attached to the sleeve about the entire perimeter of the top edge and the bottom edge of the sleeve. The elastic may be placed within a casing.

In one embodiment, a sheet of warped knit mesh, or similar fabric, is prepared having dimensions of 60 inches wide × 20 inches long as is lies raw on the grain for horizontal elasticity. Opposite edges are joined so that a tubular sleeve is formed having dimensions of 29 inches wide × 20 inches long when laid flat, with the fabric now doubled over itself to yield the tubular characteristic. A piece of elastic, having a width of approximately one (1) inch, and which is approximately 36 inches in length when unstretched, is "stretched sewn" inserted into a 60 inch × 3 inch piece of casing fabric or material. The casing containing the elastic is attached to the perimeter of the top edge of the tube, such as by sewing, while folding the casing around the tube to form a top finished edge for the device. The same process with the elastic and casing is repeated for the perimeter of the bottom edge of the sleeve.

The presence of the elastic band at the top and bottom openings of the sleeve result in a device which, by the above example, has a top and bottom perimeter of about 36 inches. The girth of the sleeve will remain at about 59 inches.

Figure 1:
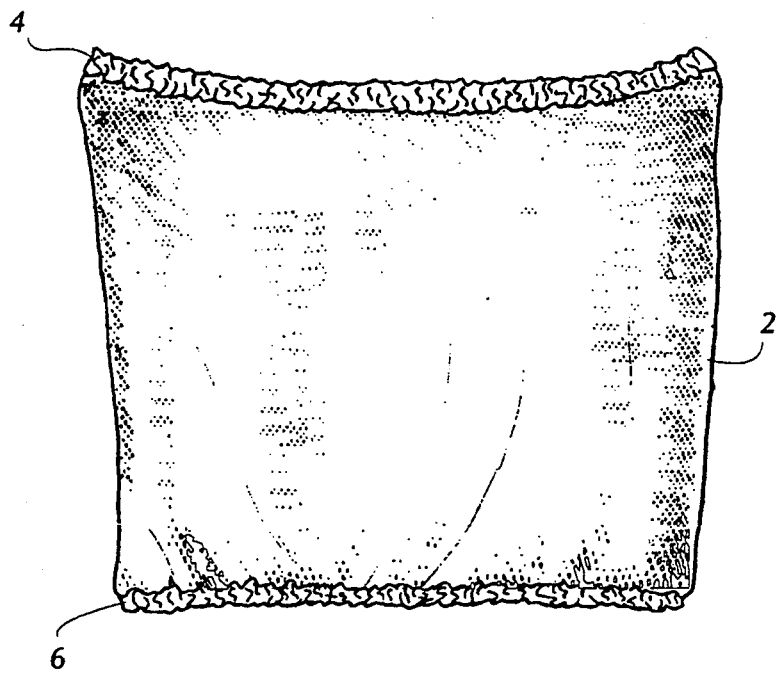
FIG. 1 is a side elevation of the container.
Figure 2:
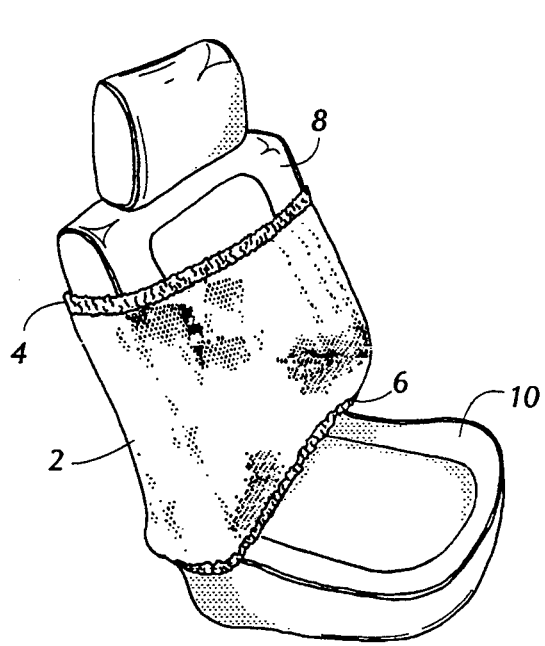
FIG. 2 is a perspective view of an automobile seat with the container placed thereon.

After the container is prepared as described above, it may be placed over a back of a seat or chair as shown in FIG. 2. The second elastic band e which is attached to the bottom edge of the sleeve holds the lower portion of the sleeve in place. The first elastic band 4 which is attached to the top portion of the sleeve holds the upper portion of the sleeve in place. The elastic bands place sufficient pressure on the back 8 of the seat to hold the device in place, due to the elastic nature of the bands. It is not necessary to slide the sleeve all the way to the seat bottom 10 as shown in FIG. 2. The elastic properties of the bands are sufficient to hold the container in place, even if not placed so far down the seat back as to contact the seat bottom.

In FIG. 2, the container is empty and has no articles placed therein. The seat will function normally as a seat, and a passenger may ride in the seat without the necessity of removing the container. Articles may be present within the container behind the seat back, and the passenger may ride in the seat without interference from the articles 12.

Figure 3:
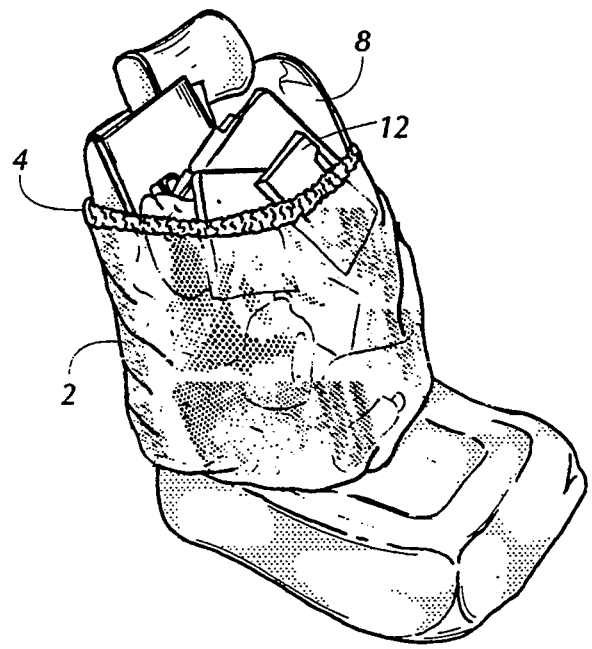
FIG. 3 is the automobile seat and container of FIG. 1, with the container having items contained therein.

Articles may be placed within the container by stretching the top band 4 away from the back 8 of the seat to allow access to the sleeve portion of the container. A few articles may be placed within the container, or numerous articles may be held as shown in FIG. 3.

In use, the top band is stretched away from the seat back. Articles are dropped through the top opening into the sleeve portion of the container, and retained therein against the sleeve and the seat back. When only a few articles are present, the top elastic band 4 will return to its position as shown in FIG. 2. When numerous articles are present within the container, the top elastic band may be held by the articles away from the seat back. The second, or bottom, elastic band should remain in contact with the seat back at substantially all points of the perimeter, so that small articles are retained within the container.

The large girth of the sleeve relative to the top and bottom perimeter of the sleeve, when the elastic is unstretched, allows the device to contain numerous articles. Further, the stretch quality of a fabric such as a mesh material allows the sleeve to form to the articles contained within the sleeve. The sleeve will form something of a "belly" as it conforms to the presence of articles within the sleeve. A mesh material also allows visiblity through the mesh of the articles within the container.

The device is easy to install and easy to use. No tools are required to slip the container over the seat back. It is only necessary to position the device over a seat back as shown in FIG. 2. Articles may be placed in front, or behind, the seat back or chair back. The device may be used with any chair or seat having a back, although caution should be taken into to avoid improper loading of the container which would cause a chair to tip over.

Figure 4:
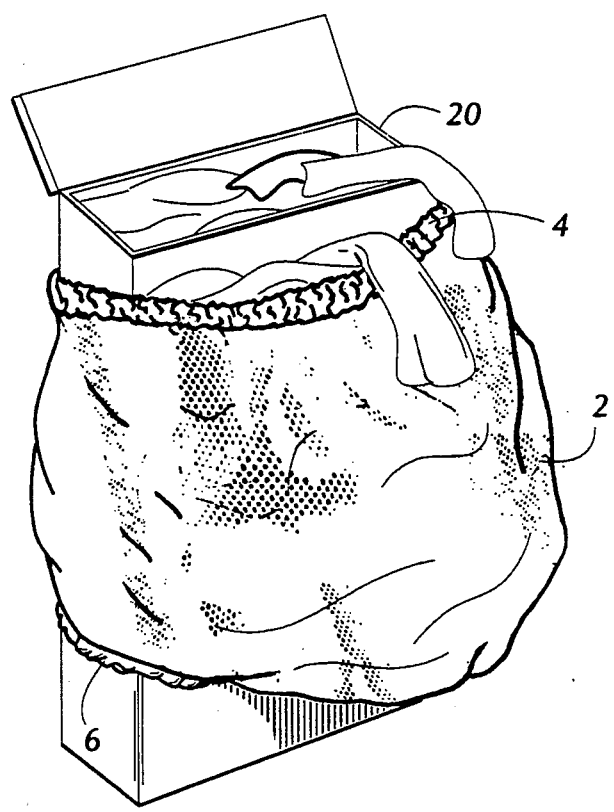
FIG. 4 is a perspective view of a clothes hamper having the container placed thereon, and having articles of clothing placed within the container.

The device may be applied to any suitable host object which will support the container and articles placed therein by means of the elastic quality of the bands. An example of such a host object is shown is FIG. 4. A common clothes hamper 20 is used to support the container. The container is fitted to the clothes hamper in a similar fashion to the example of FIGS. 2 and 3. The sleeve 2 surrounds the body of the clothes hamper, and is held in place by a first elastic band 4 and a second elastic band 6. Clothing or other articles may be placed within in the container as needed or desired. However, when the sleeve is formed of mesh material which allows air to circulate through the sleeve, wet or damp clothing or other articles may be placed in the container to dry, reducing mildew, odors, and other problems associated with placing wet or damp articles within a clothes hamper. Also, delicate clothes or different colors of clothes may be separated by sorting the clothing on different sides of the container.

What is claimed:

1. A storage container mounted to a seat back or chair back, comprising:
   a. a tubular sleeve having a stretch property;
   b. a first elastic band attached to a top opening of said tubular sleeve about a perimeter of said top opening;
   c. a second elastic band attached to a bottom opening of said tubular sleeve about a perimeter of said bottom opening; and
   d. a seat back or chair back over which said tubular sleeve is placed, wherein said seat back or chair back extends generally vertically from a support member, and wherein said seat back or chair back has one or more surfaces thereof which are sleeve;
   wherein said second elastic band and said first elastic band are positioned over said seat back or chair back with said first elastic band positioned above said second elastic band, and wherein said seat back or chair back extends through said first elastic band and said second elastic band, and said first elastic band and said second elastic band surround said seat back or chair back, and said first elastic band and said second elastic band are displaced by said seat back or chair back, and said tubular sleeve is held in place on said host by elastic means of said first elastic band and said second elastic band.

2. A storage container mounted to a host as described in claim 1, wherein said seat back or chair back has a girth which is larger than a length of said first elastic band or said second elastic band when said first elastic band and said second elastic band are constricted, but wherein said girth of said seat back or chair back is less than the girth of said sleeve.

3. A storage container mounted to a host, comprising:
   a. a tubular sleeve having a stretch property;
   b. a first elastic band attached about a top opening of said tubular sleeve about a perimeter of said top opening;
   c. a second elastic band attached about a bottom opening of said tubular sleeve about a perimeter of said bottom opening; and
   d. a host over which said tubular sleeve is positioned, wherein said host extends generally vertically from a support member and wherein said host has one or more surfaces which are covered by said tubular sleeve, and which are generally planar;
wherein a girth of said tubular sleeve is larger than a length of said first elastic band when said elastic band is in a constricted position, and wherein a girth of said tubular sleeve is larger than a length of said second elastic band when said second elastic band is in a constricted position, and wherein said second elastic band and said first elastic band surround said host, and said first elastic band is positioned above said second elastic band, and said first elastic band, said second elastic band and said tubular sleeve are held in place on said host by elastic means of said first elastic band and said second elastic band, and wherein said host is a seat back or chair back.

4. A storage container mounted to a host as described in claim 3, wherein said seat back or chair back has a girth which is larger than a length of said first elastic band or said second elastic band when said first elastic band and said second elastic band are constricted, but wherein said girth of said seat back or chair back is less than the girth of said sleeve.

5. A storage container mounted to a host, comprising:
   a. a tubular sleeve having a stretch property;
   b. a first elastic band attached to a top opening of said tubular sleeve about a perimeter of said top opening;
   c. a second elastic band attached to a bottom opening of said tubular sleeve about a perimeter of said bottom opening; and
   d. a host over which said tubular sleeve is placed, wherein said host extends generally vertically from a support member and wherein said host has four or more sides which are surrounded by said tubular sleeve, and one or more of said sides is generally planar; wherein said second elastic band and said first elastic band are positioned over said host, with said first elastic band positioned above said second elastic band, and wherein said first elastic band and said second elastic band surround said sides of said host, and wherein a portion of said host extends through said first elastic band, and a portion of said host extends through said second elastic band, and said first elastic band, said second elastic band and said tubular sleeve are held in place on said host by elastic means of said first elastic band and said second elastic band, and wherein said host is a seat back or chair back.

6. A storage container mounted to a host as described in claim 5, wherein said seat back or chair back has a girth which is larger than a length of said first elastic band or said second elastic band when said first elastic band and said second elastic band are constricted, but wherein said girth of said seat back or chair back is less than the girth of said sleeve.

* * * * *

UNITED STATES PATENT AND TRADEMARK OFFICE
CERTIFICATE OF CORRECTION

PATENT NO. : 5,354,119
DATED : October 11, 1994
INVENTOR(S) : Nicholas

It is certified that error appears in the above-indentified patent and that said Letters Patent is hereby corrected as shown below:

On title page, item [76] should read as follows:

— Inventor(s): Christopher R. Nicholas, 1209 Oldwanus Drive, Mt. Pleasant, South Carolina 29464; Mary Jayne Nicholas, 1209 Oldwanus Drive, Mt. Pleasant, South Carolina 29464; and Sandra M. Ellett, 813 Detyens Road, Mt. Pleasant, South Carolina 29464—

Signed and Sealed this

Thirty-first Day of January, 1995

Attest:

BRUCE LEHMAN

Attesting Officer  Commissioner of Patents and Trademarks